(12) United States Patent
Adayikkoth

(10) Patent No.: US 9,286,311 B2
(45) Date of Patent: Mar. 15, 2016

(54) REAL-TIME FILTERING OF RELEVANT EVENTS FROM A PLURALITY OF EVENTS

(71) Applicant: Santhosh Adayikkoth, Bangalore (IN)

(72) Inventor: Santhosh Adayikkoth, Bangalore (IN)

(*) Notice: Subject to any disclaimer, the term of this patent is extended or adjusted under 35 U.S.C. 154(b) by 84 days.

(21) Appl. No.: 13/918,151

(22) Filed: Jun. 14, 2013

(65) Prior Publication Data

US 2013/0339375 A1 Dec. 19, 2013

(30) Foreign Application Priority Data

Jun. 14, 2012 (IN) ............................ 2380/CHE/2012

(51) Int. Cl.
*G06F 17/30* (2006.01)
*G06F 11/30* (2006.01)

(52) U.S. Cl.
CPC ...... *G06F 17/30144* (2013.01); *G06F 11/3006* (2013.01); *G06F 11/3072* (2013.01); *G06F 2201/805* (2013.01); *G06F 2201/86* (2013.01)

(58) Field of Classification Search
CPC ...................... G06F 11/3072; G06F 17/30144
See application file for complete search history.

(56) References Cited

U.S. PATENT DOCUMENTS

| | | | | |
|---|---|---|---|---|
| 2006/0143439 A1* | 6/2006 | Arumugam et al. | .......... | 713/153 |
| 2007/0255529 A1* | 11/2007 | Biazetti et al. | ................ | 702/186 |
| 2012/0054246 A1* | 3/2012 | Fischer | ......................... | 707/793 |
| 2013/0162425 A1* | 6/2013 | Raghunathan et al. | ........ | 340/517 |
| 2013/0290305 A1* | 10/2013 | Feng et al. | ..................... | 707/722 |
| 2013/0325787 A1* | 12/2013 | Gerken et al. | .................. | 706/52 |
| 2013/0332240 A1* | 12/2013 | Patri et al. | ..................... | 705/7.36 |
| 2014/0165140 A1* | 6/2014 | Singla et al. | ...................... | 726/1 |

OTHER PUBLICATIONS

Brenda M. Michelson, "Event-Driven Architecture Overview: Event-Driven SOA Is Just Part of the EDA Story", Feb. 2, 2006, Patricia Seybold Group, 9 pages.*
Eugene Wu et al., "High-Performance Complex Event Processing Over Streams", ACM SIGMOD 2006, Jun. 27-29, 2006, pp. 407-418.*
Fusheng Wang et al., "Bridging Physical and Virtual Worlds: Complex Event Processing for RFID Data Streams", 2006, Springer, EBDT 2006, LNCS 3896, pp. 588-607.*

* cited by examiner

*Primary Examiner* — Scott A Waldron
(74) *Attorney, Agent, or Firm* — LeClairRyan, a Professional Corporation

(57) ABSTRACT

This technology relates to real-time filtering of relevant events from a plurality of events distributed spatially. An event processing engine receives the plurality of events from one or more real-time data sources. The received plurality of events are each compared with significant events stored in a significant event database and an entity associated with each of the significant events is identified. Next, the event processing engine identifies related events associated with each of the identified entities. The related events are aggregated to form one or more temporal sequence structures which are then matched with a plurality of sequential event patterns to identify each of the temporal sequence structures which match at least one of the plurality sequential event patterns. The entity associated with the one or more temporal sequence structures is filtered for providing one or more actions.

15 Claims, 3 Drawing Sheets

REAL-TIME FILTERING OF RELEVANT EVENTS FROM A PLURALITY OF EVENTS

This application claims the benefit of Indian Patent Application Filing No. 2380/CHE/2012, filed Jun. 14, 2012, which is hereby incorporated by reference in its entirety.

TECHNICAL FIELD

The present disclosure is related to event processing. In particular, the present disclosure relates to a method and system for real-time filtering of relevant events aimed at the real time extraction of actionable insights, in an effective manner, from a plurality of events distributed spatially

BACKGROUND

Event processing, in general, is a method of tracking and analyzing live streams of data that are gathered on day to day basis. The streams of data that are gathered are generated by various data sources. The various data sources consists of information related to, but not limited to web logs, radio frequency identification (RFID) signals, sensor networks, social networks, online transactions, e-commerce, internet, medical surveillance, archives of photos and videos and etc. Generally, there exist various tools or techniques for processing the stream of events generated by various data sources. One such technique, normally used in the existing arts is Complex event processing (CEP). The CEP combines the event data from multiple data sources. The rising popularity of CEP techniques is due to multiple facts that include unprecedented growth in the 'points of observation'/data stream sources and decreasing 'information payload' in individual events to drive effective decisions.

The event data from multiple data sources are combined to infer relevant patterns from the data sources, which helps to envisage or suggest one or more complicated circumstances. Some examples of such relevant events may be a flurry of seemingly fraudulent credit card transactions from a customer, a burst of crime related activities, a set of potential hacking attempts from an Internet Protocol (IP) address that is not in any watch list, break out of an epidemic in an otherwise healthy community etc. These bursts of critical events or also referred as complicated circumstances, thus may call for an immediate intervention, irrespective of the historical data associated with the related entity associated with the one or more data sources. Identifying such critical events manually from the continuous flow of event data, in near real-time, may be very difficult. Identifying critical events from the continuous flow of event data may be difficult due to one or more reasons, which includes, but are not limited to, the volume, velocity and the possible distributed nature of these events which are distributed in time, location and/or channels of user interaction.

The main limitations with the conventional CEP solutions are in its capability to scale up to 'Big Data proportions' i.e. high volumes and velocities, without 'dropping' potentially critical events and/or failing to detect 'critical patterns' on time. With the rising volume and velocity of the data streams, the amount on processing power required to perform correlation of every single event in near real time and the amount of temporary data storage required to stage event data before their analysis can restrict conventional CEP engines from scaling up. This can result in loss of real business value.

Thus, the conventional methods to identify such relevant events from the plurality of events which are distributed spatially includes parallel processing databases, in-memory databases, messaging solutions, data mining grids, distributed file systems, distributed databases, cloud computing platforms and scalable storage systems. These methods are generally not capable for efficiently processing large quantities of data that is streaming in from multiple distributed sources, within tolerable elapsed times so that a notification, alert or an intervention can be provided in near real-time with minimal latency.

Hence, there exists a need to develop a system and method that can scale up big data proportions by discarding unimportant/irrelevant events and thereby directing its computing power and memory to attend to the relevant events, in other words, filtering relevant events in near real-time and for the real time extraction of actionable insights from them in an effective manner, from the plurality of events which are distributed spatially.

SUMMARY

The shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

The present disclosure provides a method for filtering relevant events in real-time from plurality of events distributed spatially. The method comprises receiving plurality of events from one or more real-time data sources by an event processing engine configured in a computing unit, wherein the plurality of events are received over a distributed communication network, wherein each of the plurality of events is associated with one or more entities. The plurality of received events are compared with preconfigured list of significant events by the event processing engine to identify one or more events from the plurality of events matching at least one event in the preconfigured list of significant events, wherein the preconfigured list of significant events is stored in a significant event database configured in the event processing engine. Upon identifying the one or more events matching at least one event in the preconfigured list of significant events, an entity associated with each of the identified one or more events matching at least one event in the preconfigured list of significant events is identified as a critical entity. Thereafter, a plurality of plurality of temporal sequence structures are generated by an event chain building module configured in the event processing engine, wherein each of the plurality of temporal sequence structures is generated by selectively aggregating plurality of events, which are received subsequently and associated with the identified critical entity, by the respective critical entity. The method further comprises comparing each of the generated plurality of temporal sequence structures with preconfigured sequential event patterns by a pattern matching engine to identify one or more temporal sequence structures from the plurality of temporal sequence structures substantially matching at least one preconfigured sequential event patterns from the plurality of preconfigured sequential event patterns, wherein the preconfigured plurality of sequential event patterns are stored in a sequential event pattern database configured in the event processing engine.

The present disclosure provides a method for filtering relevant events in real-time from plurality of events distributed spatially. The method comprises receiving plurality of events from one or more real-time data sources by an event processing engine configured in a computing unit, wherein the plurality of events are received over a distributed communication network, wherein each of the plurality of events is associated with one or more entities. The method further comprises identifying an entity associated with each of the received one or more events. Thereafter, plurality of temporal sequence structures are generated by an event chain building module configured in the event processing engine, wherein the plurality of temporal sequence structures are generated by aggregating the received events by their associated entity. The method further comprises comparing the generated plurality of temporal sequence structures with preconfigured plurality of sequential event patterns by a pattern matching engine to identify one or more temporal sequence structures substantially matching at least one preconfigured sequential event pattern. The preconfigured plurality of sequential event patterns is stored in a sequential event pattern database configured in the event processing engine. The method further comprises selecting the entity associated with the identified one or more events in the generated temporal sequence structure matching at least one sequential event pattern for providing one or more actions.

The present disclosure provides a system for filtering relevant events in real-time from plurality of events distributed spatially. The system comprises one or more real-time data sources and an event processing engine. The one or more real-time data sources comprise plurality of events, wherein each of the plurality of events associated with one or more entities. The event processing engine is configured in a computing unit. The event processing engine receives the plurality of events from the one or more real-time data sources over a distributed communication network. Upon receiving the plurality of events, the event processing engine compares the received plurality of events with a preconfigured list of significant events to identify one or more events from the plurality of events substantially matching at least one event in the preconfigured list of significant events. The event processing engine identifies an entity associated with each of the identified one or more events matching at least one event in the preconfigured list of significant events. Upon identifying the entity, plurality of temporal sequence structures are generated using an event chain building module configured in the event processing engine, wherein each of the plurality of temporal sequence structures is generated by selectively aggregating plurality of events received subsequently and associated with each of the identified entity, by the respective entity. The pattern matching module configured in the event processing engine compares each of the generated plurality of temporal sequence structures with preconfigured sequential event patterns to identify one or more temporal sequence structures from the plurality of temporal sequence structures substantially matching to the preconfigured sequential event patterns.

The foregoing summary is illustrative only and is not intended to be in any way limiting. In addition to the illustrative aspects and features described above, further aspects, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure provides a method to discard unimportant or irrelevant events and thereby direct its computing power and memory to attend to the relevant events, in other words, filter relevant events in real-time from plurality of events distributed spatially and thereby extract actionable insights from them in real time in an effective manner. This is enabled by, but not limited to, a unique capability provided by this disclosure to form 'Entity Oriented Selective Aggregates of Events' from Distributed Event Data Streams.

Figure 1:
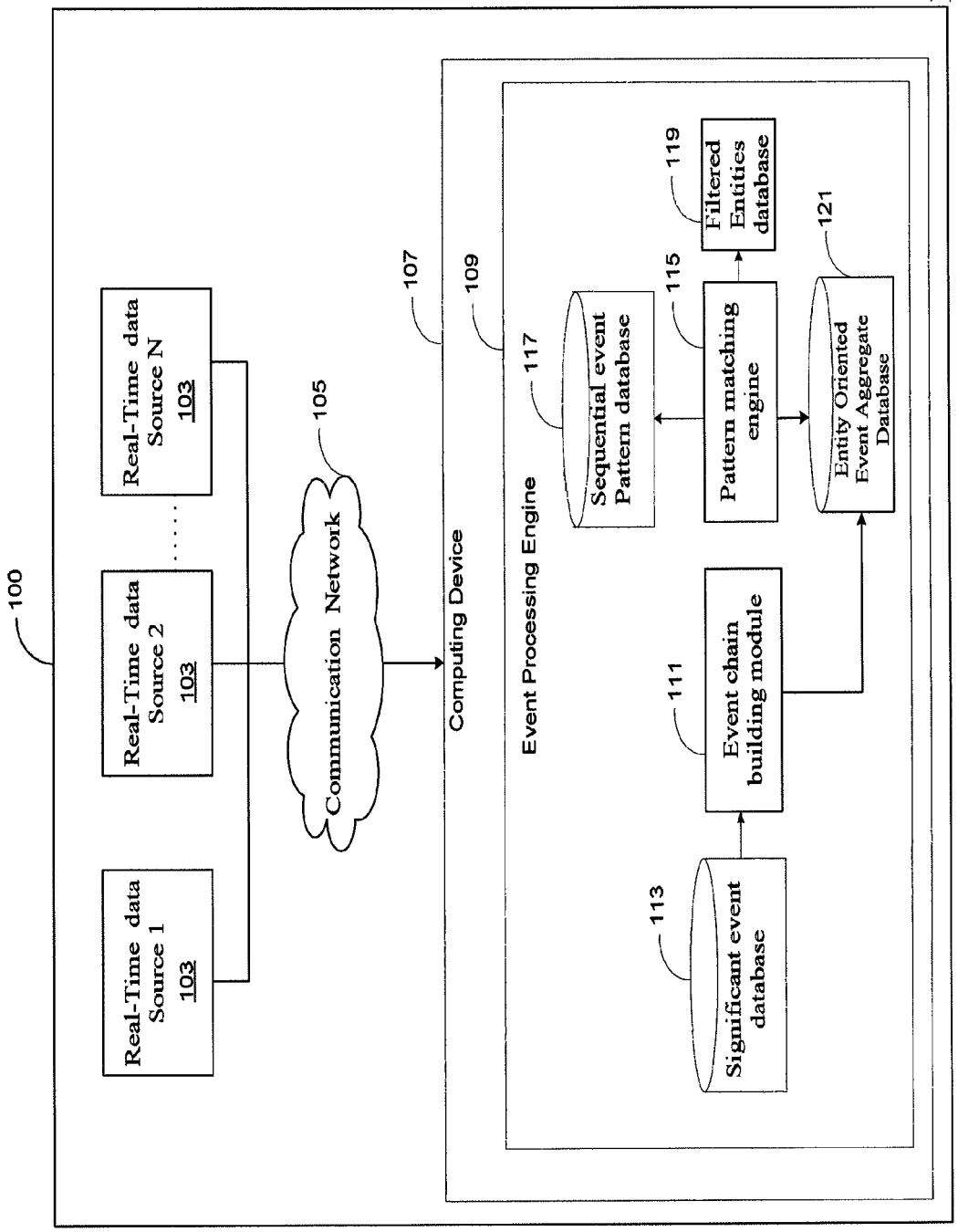
FIG. 1 illustrates a system for real-time filtering of relevant events from plurality of events distributed spatially in accordance with an embodiment of the present disclosure.

FIG. 1 illustrates a system 100 for real-time filtering of relevant events from plurality of events distributed spatially. The system 100 comprises one or more real-time data sources 103, a computing device 107 and an event processing engine 109 configured in the computing device 107. The one or more real-time data sources 103 are the data sources consisting of information related to at least one of radio frequency identification (RFID) signals, web logs, sensor networks, social networks, online transactions, e-commerce, internet text, medical surveillance, military surveillance and any other real-time data sources. The one or more real-time data sources 103 are distributed spatially in a distributed communication network 105. The event processing engine 109 comprises an event chain building module 111, a significant event database 113, a pattern matching engine 115, a sequential event pattern database 117, entity oriented event aggregate database 121 and filtered entities database 119.

The event processing engine 109 configured in the computing device 107 receives the plurality of events from the one or more real-time data sources 103. Upon receiving the plurality of events from the one or more real-time data sources 103, the event processing engine 109 compares the received plurality of events with preconfigured list of significant events stored in the significant event database 113. As an example, the significant events stored in the significant event database 113 are the events related to flurry of seemingly fraudulent credit card transactions from a customer, crime related activities, a set of potential hacking attempts from an Internet Protocol (IP) address and any other significant events which are deemed as critical. If the one or more events in the received plurality of events match at least one event in the preconfigured list of significant events then the one or more events are selected for further processing by the event processing engine 109. The event processing engine 109 identifies an entity associated with each of the one or more events. The identified entity is known as the critical entity. The entity is related to one or more establishments. The one or more establishments includes, but are not limited to financial institutions, commercial establishments, government offices, data security centers, weather forecast centers, global supply chains and manufacturing industries. The event processing engine 109 thereafter captures subsequent events that are associated with each of the identified entity. Upon obtaining the related events for each of the identified entity, the event chain building module 111 aggregates the related events in real-time to generate a temporal sequence structure and the generated temporal sequence structures are stored in an entity oriented event aggregate database 121. The temporal sequence structure is aggregation of related events of the identified entity. Similarly, the temporal sequence structure is generated for each of the identified entity.

After generating the plurality of temporal sequence structures, the pattern matching engine 115 compares dynamically each of the generated temporal sequence structure stored in the entity oriented event aggregate database 121 with plurality of sequential event patterns stored in the sequential event pattern database 117. As and when the related events are getting aggregated in real-time in the entity oriented event aggregate database 121, the pattern matching engine 115 matches incrementally each of the related event in the temporal sequence structure with the plurality of sequential event patterns stored in the sequential event pattern database 117. The sequential event pattern database 117 stores the plurality of event patterns in a sequential manner. Each of the plurality of sequential event pattern consists of events patterns, which represent significant business situations and are identified as critical. If the one or more temporal sequence structure match at least one sequential event pattern, then the entity associated with the one or more temporal sequence structure is filtered for further processing. The filtered entities are stored in the filtered entities database 119 for further processing. The event processing engine 109 determines whether there is probability of a critical business situation based on the events stored in each of the one or more temporal sequence structures. The probability of critical business situation is established if the level of match between the event patterns in plurality of sequential event patterns, in each of the identified one or more temporal sequence structures is at least one of equal to or greater than predefined threshold value. The predefined threshold value varies for different scenarios and different situations in each of the one or more establishments. If there is a probability of the critical business situation, the event processing engine selects the entity associated with each of the identified one or more temporal sequence structures in which the probability of the critical business situation is determined for providing one or more actions. Once the one or more actions/alerts/interventions are initiated for the entity, the temporal sequence structure associated with that entity is cleared. The temporal sequence structure associated with the entity is cleared after the expiry of a preset time (decay out) as well.

The one or more actions can be providing notification or alerts to the one or more establishments associated with the entity about the critical events in real-time and within minimal latency. The predefined threshold value varies differently for different domains and different scenarios in each of the one or more establishments.

If there is no probability of the critical business situation in each of the identified temporal sequence structures, then the one or more temporal sequence structure is discarded from the event processing engine 109.

Now, filtering the events is explained with at least one example for the purposes of illustration only. However such example should not be construed as limitation of the instant disclosure. The person skilled in the art readily understands that such illustrations can be applied on various other technical fields or environments. In an exemplary embodiment the event processing engine 109 is used to enable the key stakeholders of a supply chain to identify critical business situations by filtering out and observing relevant business events distributed across multiple departments and to improve its capability to respond to these critical business situations on time. The event processing engine 109 is configured in the computing device 107 having a user interface. In this exemplary embodiment, we include three departments namely, logistic department having a logistic manager, inventory department having an inventory manager and a store department having a store manager. Each of these three departments includes respective real-time data sources that are related to the business events materializing within that department. For example, the logistic department includes a real-time data source 1 103 related to the movement of materials and goods within the establishment's supply chain, the inventory department includes a real-time data source 2 103 that is related to the real time inventory transactions within that establishment and the store department includes a real-time data source 3 103 that is related to the sale of products belonging to that establishment.

In this exemplary embodiment, multiple events occurring across the establishment's departments are amalgamated contextually, to evaluate the criticality of the business situation. The real-time data source 1 103 streams events regarding disruption in services of a logistic provider which could delay shipment of various components required for various products. Since there is a delay in the shipment, a component namely a "component A" which is included in this shipment and is required for assembling various products is delayed. In this scenario, one of the events is "delay in shipment" and is associated to the Entity 'Component A'. The real-time data source 2 103 streams events related to the stocked components. The inventory manager notes that some components in the stock are moving below the safety level including the component, "component A". In this scenario, one of the events is "dip in inventory" and is associated with Entity 'Component A'. The real-time data source 3 103 streams events related to the sale of products. The store manager identifies that the demand of a particular product is picking up well and hence the store manager is looking at getting some additional shipments of the product. The component A is a key component of the product. In this scenario, one of the events is "increase in demand" and is associated with the Entity 'Component A'.

The three entities are distributed spatially in the communication network 105. The event processing engine 109 receives plurality of events from the real-time data source 1103. One of the events in the plurality of events is "delay in shipment". Upon receiving the plurality of events from the real-time data source 1103, the event processing engine 109 compares the received plurality of events with the preconfigured list of significant events. The preconfigured list of significant events is stored in the significant event database 113. The significant events stored in the significant event database are say, "delay in shipment", "increase in price of a component" and "compliance check failure". The event processing engine 109 checks if the received plurality of events belongs to the set of significant events. Only those events that are identified as significant events are selected for further processing. In this scenario, the event "delay in shipment" is selected as a significant event.

The event processing engine 109 identifies the entity associated with the significant event. The entity is the "component A". Now, the event processing engine 109 starts tracking and aggregating all the subsequent events which are related to "component A". The event processing engine 109 observes "dip in inventory" event and also in the "increase in demand" event as the ones that are associated to "component A". The event processing engine 109 obtains the related events in which the entity is present from the respective real-time data sources 103. Upon obtaining the related events, the event chain building module 111 aggregates the related events in real-time to generate the temporal sequence structure which is stored in an Entity Oriented Event Aggregate database 121. In this case the temporal sequence structure is the aggregation of three events namely, "delay in shipment", "dip in inventory" and "increase in demand" with the entity "component A" as the key. The pattern matching engine 109 matches the generated temporal sequence structure with the plurality of sequential event patterns stored in the sequential event pattern database 117. The sequential event pattern database 117 stores the event patterns in a sequential manner which is critical from a business stand point. If the level of match between the temporal sequence structure and the event patterns in the sequential event pattern is equal to or greater than a predefined threshold value then the entity associated with the temporal sequence structure is filtered for initiating one or more actions. In this scenario the sequence structure of "delay in shipment", "dip in inventory" and "increase in demand" matches the preconfigured event sequence beyond the predefined threshold value and thus indicate a critical business situation and the "component A" and its associated entities/establishments i.e logistic department and the inventory department are filtered to provide one or more actions. The one or more actions can be providing alerts/notification to the logistic manager and the inventory manager to initiate one or more functions such as arranging for shipment etc.

If the event patterns aggregated in real-time does not match with the sequential event patterns stored in the sequential event pattern database 117 beyond a preconfigured time, the event processing engine 109 discards the temporal sequence structure.

Figure 2A:
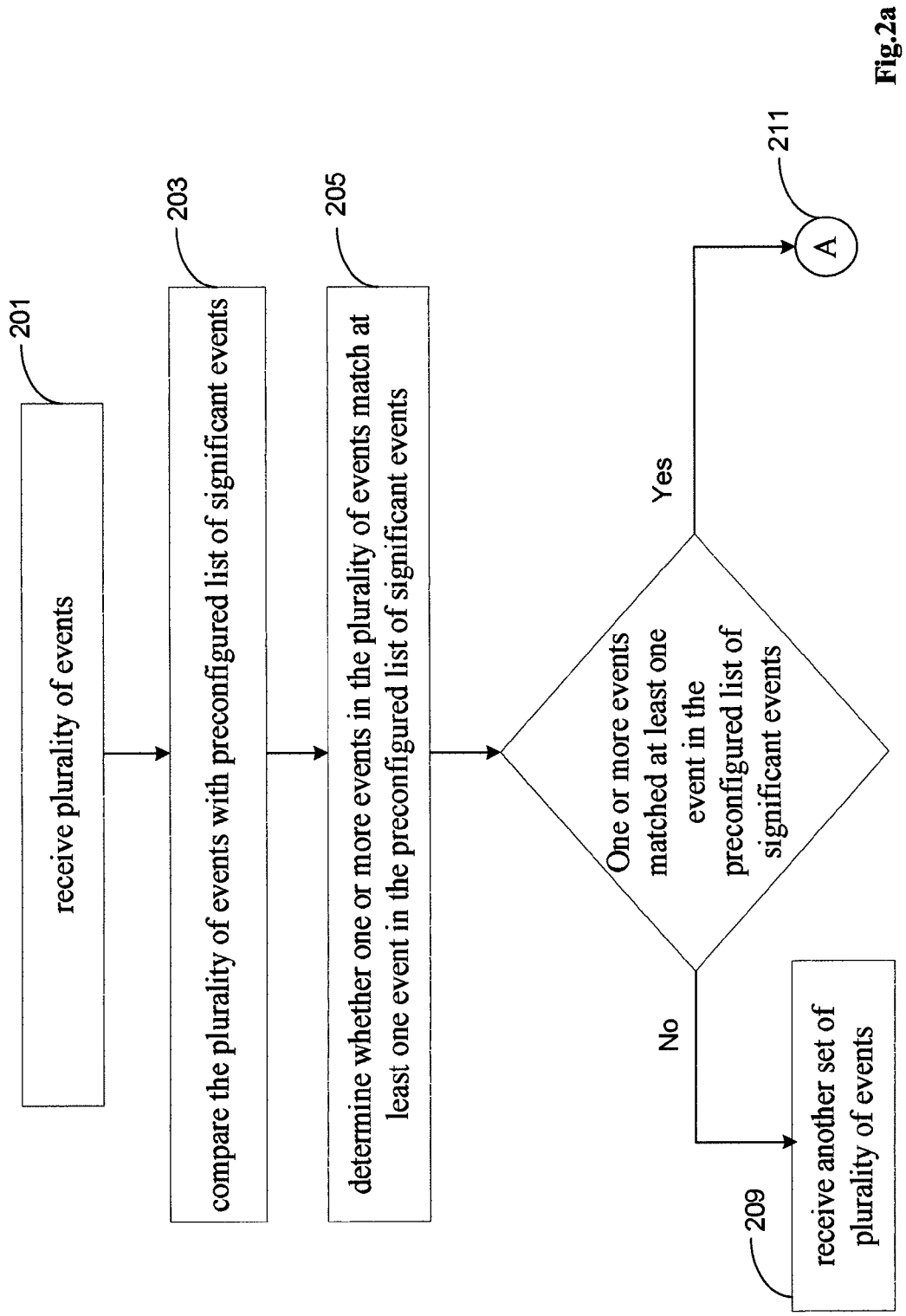
FIGS. 2a-2b illustrates a method for real-time filtering of relevant events from plurality of events distributed spatially in accordance with an embodiment of the present disclosure.
Figure 2B:
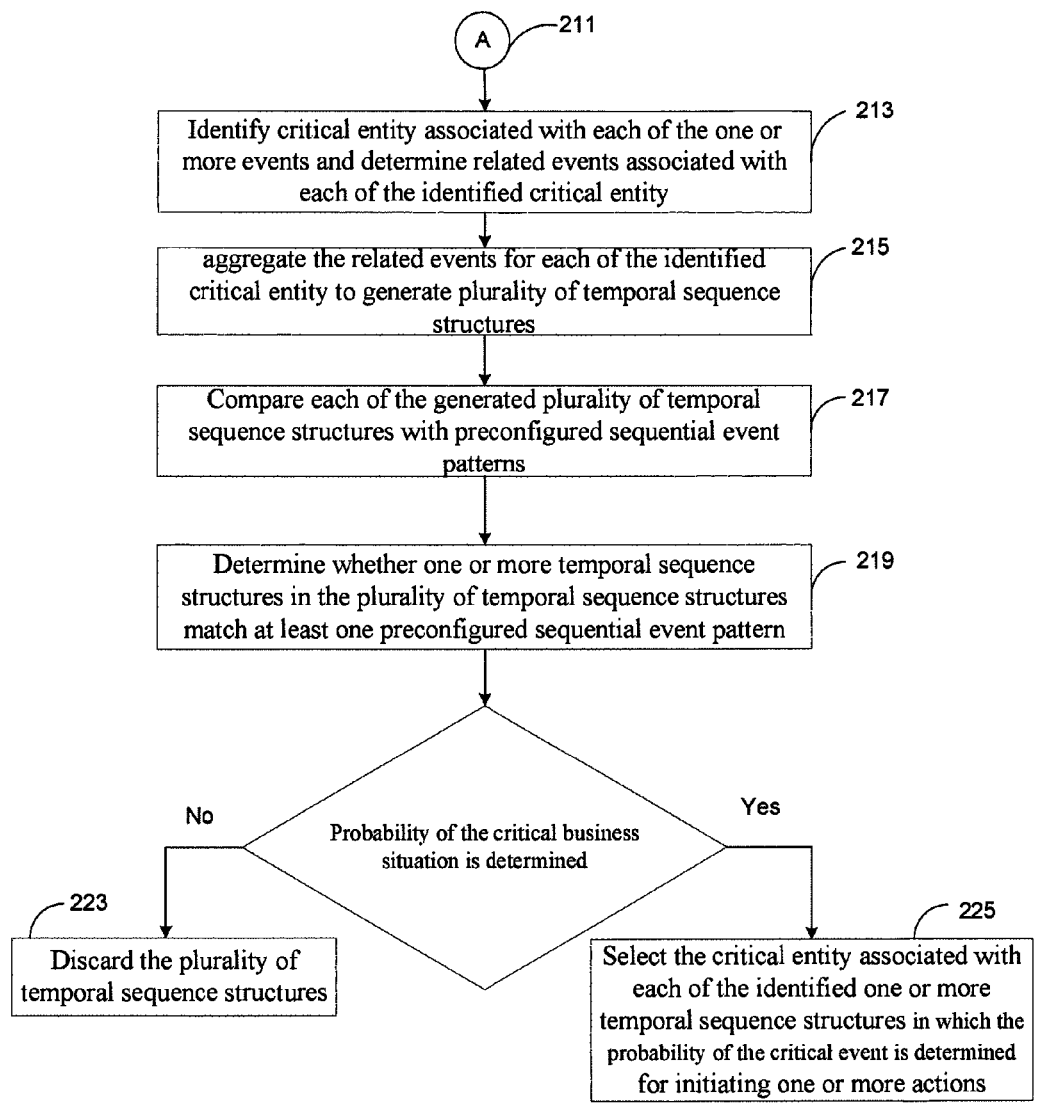

FIGS. 2a-2b illustrates a method for filtering related event patterns in real-time from plurality of event patterns distributed spatially in accordance with an embodiment of the present disclosure. The event processing engine 109 receives plurality of events at step 201 from the one or more real-time data sources 103 distributed spatially in a distributed communication network 105. Upon receiving the plurality of events, the event processing engine 109 compares the received plurality of events with the significant events stored in the significant event database 113 at step 203. The event processing engine 109 determines whether the one or more events in the received plurality of events match at least one significant event in the preconfigured list of significant events at step 205. If the one or more events in the received plurality of events match at least one significant event in the preconfigured list of significant events then the one or more events are selected for further processing at step 211. If the one or more events in the received plurality of events does not match at least one significant event in the preconfigured list of significant events then the received plurality of events are discarded and the event processing engine 109 receives another set of plurality of events at step 209.

The event processing engine 109 identifies an entity associated with each of the identified one or more events. Upon identifying the entity, the event processing engine 109 determines the related events associated with each of the critical entity at step 213. The related events are distributed spatially in the distributed communication network 105. The event processing engine 109 obtains the related events for each of the identified entity. Thereafter, the event processing engine 109 selectively aggregates the related events to generate plurality of temporal sequence structures at step 215. At step 217, the pattern matching engine 115 configured in the event processing engine compares the plurality of temporal sequence structures with plurality of preconfigured sequential event patterns. The plurality of preconfigured sequential event patterns is stored in the sequential event patterns database. At step 219, the pattern matching engine 115 determines whether one or more temporal sequence structures in the plurality of temporal sequence structures match at least one preconfigured sequential event pattern. If the level of match between a temporal sequence structure and at least one of the preconfigured sequential event patterns is at least one of equal to or greater than predefined threshold value, then the probability of a critical business situation is inferred. Then the event processing engine 109 selects the entity associated with each of the identified one or more temporal sequence structures in which the probability of the critical business situation is determined for providing one or more actions at step 225. If there is no probability of the critical business situation in each of the identified one or more temporal sequence structures then the event processing engine 109 discards the identified one or more temporal sequence structures at step 223.

The foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | System |
| 103 | Real-time data sources |
| 105 | Communication network |
| 107 | Computing device |
| 109 | Event processing engine |
| 111 | Event chain building module |
| 113 | Significant event database |
| 115 | Pattern matching engine |
| 117 | Sequential event pattern database |
| 119 | Filtered entities database |

We claim:

1. A method for real-time filtering of relevant events from plurality of events distributed spatially in an inventory management system, the method comprising:

receiving, by an event management computing device, a plurality of inventory management events comprising information associated with a delayed shipment of a component, a reduction in a total number of the component currently in inventory, and an increase in demand for the component due to a non-availability of the component, wherein the plurality of inventory management events are received from one or more real-time external data sources comprising radio frequency identification (RFID) signals, one or more web logs, one or more sensor networks, and one or more social networks;

comparing, by the event management computing device, the received plurality of inventory management events with a preconfigured list of significant inventory events stored in a significant event database to identify one or more first matches;

identifying, by the event management computing device, the non-available component as an entity associated with each of the identified one or more first matches;

generating, by the event management computing device, a plurality of temporal inventory event sequence structures by selectively aggregating a plurality of inventory management events that are received subsequently and associated with the identified entity;

comparing, by the event management computing device, each of the generated plurality of temporal inventory event sequence structures with a stored plurality of sequential inventory event patterns to identify one or more second matches;

identifying, by the event management computing device, a critical business situation based on the identified one or more second matches between the generated plurality of temporal inventory event sequence structures and the stored plurality of sequential inventory event patterns; and discarding, by the event management computing device, the generated plurality of temporal inventory event sequence structures as an irrelevant plurality of temporal inventory event sequence structures when the identified one or more second matches is less than a threshold match level; and allocating, by the event management computing device, a memory and a processor of the event management computing device to further process the generated plurality of temporal inventory event sequence structures only when the identified one or more second matches is equal to or greater than the threshold match level.

2. The method as claimed in claim 1, wherein the method further comprises:

checking, by the event management computing device, each of the identified one or more second matches to determine a probability of whether the critical business situation is occurring; and selecting, by the event management computing device, the entity for providing one or more actions for the entity.

3. The method as claimed in claim 2, wherein the one or more actions for the entity comprise at least one of alerts, notifications, and interventions.

4. The method as claimed in claim 2, wherein the probability of whether the critical business situation is occurring in each of the identified one or more second matches is determined when the identified one or more second matches is equal to or greater than the threshold match level.

5. The method as claimed in claim 4, wherein the threshold match level is adjusted based on one or more establishments related to the entity.

6. A non-transitory computer readable medium having stored thereon instructions for real-time filtering of relevant events from plurality of events in an inventory management system comprising machine executable code which when executed by at least one processor, causes the processor to perform steps comprising:

receiving a plurality of inventory management events comprising information associated with a delayed shipment of a component, a reduction in a total number of the component currently in inventory, and an increase in demand for the component due to a non-availability of the component, wherein the plurality of inventory management events are received from one or more real-time external data sources comprising radio frequency identification (RFID) signals, one or more web logs, one or more sensor networks, and one or more social networks;

comparing the received plurality of inventory management events with a preconfigured list of significant inventory events stored in a significant event database to identify one or more first matches;

identifying the non-available component as an entity associated with each of the identified one or more first matches;

generating a plurality of temporal inventory event sequence structures by selectively aggregating a plurality of inventory management events that are received subsequently and associated with the identified entity;

comparing each of the generated plurality of temporal inventory event sequence structures with a stored plurality of sequential inventory event patterns to identify one or more second matches;

identifying a critical business situation based on the identified one or more second matches between the generated plurality of temporal inventory event sequence structures and the stored plurality of sequential inventory event patterns; and discarding the generated plurality of temporal inventory event sequence structures as an irrelevant plurality of temporal inventory event sequence structures when the identified one or more second matches is less than a threshold match level; and allocating a memory and a processor of the event management computing device to further process the generated plurality of temporal inventory event sequence structures only when the identified one or more second matches is equal to or greater than the threshold match level.

7. The medium as set forth in claim 6, wherein the steps further comprise:

checking each of the identified one or more second matches to determine a probability of whether the critical business situation is occurring; and selecting the entity for providing one or more actions for the entity.

8. The medium as set forth in claim 7, wherein the one or more actions for the entity comprise at least one of alerts, notifications, and interventions.

9. The medium as set forth in claim 7, wherein the probability of whether the critical business situation is occurring in each of the identified one or more second matches is determined when the identified one or more second matches is equal to or greater than the threshold match level.

10. The medium as set forth in claim 9, wherein the threshold match level is adjusted based on one or more establishments related to the entity.

11. An event management computing device comprising:
a processor; and
a memory, wherein the memory is coupled to the processor and the processor executes programmed instructions stored in the memory, the instructions comprising:

receiving a plurality of inventory management events comprising information associated with a delayed shipment of a component, a reduction in a total number of the component currently in inventory, and an increase in demand for the component due to a non-availability of the component, wherein the plurality of inventory management events are received from one or more real-time external data sources comprising radio frequency identification (RFID) signals, one or more web logs, one or more sensor networks, and one or more social networks;

comparing the received plurality of inventory management events with a preconfigured list of significant inventory events stored in a significant event database to identify one or more first matches;

identifying the non-available component as an entity associated with each of the identified one or more first matches;

generating a plurality of temporal inventory event sequence structures by selectively aggregating a plurality of inventory management events that are received subsequently and associated with the identified entity;

comparing each of the generated plurality of temporal inventory event sequence structures with a stored plurality of sequential inventory event patterns to identify one or more second matches;

identifying a critical business situation based on the identified one or more second matches between the generated plurality of temporal inventory event sequence structures and the stored plurality of sequential inventory event patterns; and discarding the generated plurality of temporal inventory event sequence structures as an irrelevant plurality of temporal inventory event sequence structures when the identified one or more second matches is less than a threshold match level; and allocating a memory and a processor of the event management computing device to further process the generated plurality of temporal inventory event sequence structures only when the identified one or more second matches is equal to or greater than the threshold match level.

12. The device as set forth in claim 11, wherein the instructions further comprise:

checking each of the identified one or more second matches to determine a probability of whether the critical business situation is occurring; and selecting the entity for providing one or more actions for the entity.

13. The device as set forth in claim 12, wherein the one or more actions for the entity comprise at least one of alerts, notifications, and interventions.

14. The device as set forth in claim 12, wherein the probability of whether the critical business situation is occurring in each of the identified one or more second matches is determined when the identified one or more second matches is equal to or greater than the threshold match level.

15. The device as set forth in claim 14, wherein the threshold match level is adjusted based on one or more establishments related to the entity.

* * * * *